United States Patent [19]

Jang

[11] Patent Number: 5,343,774

[45] Date of Patent: Sep. 6, 1994

[54] TRANSMISSION GEAR BOX FOR MINIATURE MOTOR

[76] Inventor: Shuh Y. Jang, No. 24-2 Wann Nian Lane, Yuan Lin, Chang Hua, Taiwan

[21] Appl. No.: 15,514

[22] Filed: Feb. 9, 1993

[51] Int. Cl.$^5$ ............................................. F16H 57/02
[52] U.S. Cl. .................................. 74/421 A; 74/397; 74/606 R; 310/83; 310/89
[58] Field of Search ................. 74/397, 421 A, 606 R; 310/83, 89

[56] References Cited

U.S. PATENT DOCUMENTS 1,785,798  12/1930  Weiss ................................ 74/421 A
4,942,325   7/1990  Fukaya ............................. 310/89 X

FOREIGN PATENT DOCUMENTS 1004550   9/1965   United Kingdom ............. 74/421 A

*Primary Examiner*—Allan D. Herrmann
*Attorney, Agent, or Firm*—Browdy and Neimark

[57] ABSTRACT

An improved transmission gear box for miniature motor is equipped with a motor-mounted round plate having a number of equally spaced protrusions or recesses disposed on the periphery thereof. The round plate secured to the case of a motor is provided with a round through hole at the center thereof and a pair of symmetric oval-shaped through holes are disposed at each of the opposite sides of the round hole, and a transmission gear set is operationally associated with and supported by the round plate. The shaft of the miniature motor disposed through the central round hole of the round plate is provided with a gear at the top end thereof so as to permit the engagement of the same to the transmission gear set. A cap having a number of corresponding recesses or protrusions disposed at the periphery of the bottom end thereof can be tightly engaged with the round plate. A second round hole having a vertical flanged skirt is disposed at the top of the cap with one rotation shaft of the gear set extended therethrough. The present transmission gear box is characterized in its simple structure and ready assembly to a motor and easy production thereof.

2 Claims, 3 Drawing Sheets

TRANSMISSION GEAR BOX FOR MINIATURE MOTOR

BACKGROUND OF THE INVENTION

The present invention relates to an improved transmission gear box adapted particularly for a miniature motor, which is characterized in its simple structure, ready assembly to a miniature motor and easy production thereof and provided with a round plate and a cap that are easily snapped together. The round plate having a central through hole disposed at the center thereof and a pair of oval shaped through holes are located at the opposite sides of the center hole respectively is secured to the output end of a miniature motor with the shaft of the motor sticking out of the central through hole of the round plate with a gear disposed at the end of the same. A transmission gear set is operably disposed on top of the round plate. The periphery of the round plate is provided with a number of protrusions or recesses that can be in snapping engagement with the corresponding recesses or protrusions disposed on the periphery of the bottom of the cap with the transmission gear set housed therein.

A conventional transmission gear box, as shown in FIGS. 1, is mainly comprised of a miniature motor 1A, a gear set 5A, a base board 51A, an upper cap 6A and a positioning plate 7A. The base board 51A is provided with a number of recessed cuts 510 A on the periphery thereof which are engaged with a number of corresponding protrusion spots 610 A disposed on the inner periphery of the bottom of the upper cap 6A so as to permit the upper cap 6A to be engaged with the base board 51A.

This prior art has the following disadvantages in the production and use:

1. There are many redundant parts used, such as the motor lid 11A and the base board 51A which serves as the base of the transmission gear box, and the production and assembly thereof are relatively difficult.
2. The protrusion spots of the upper cap and the recessed cuts disposed on the periphery of the base board are not engaged with each other firmly; and the riveting process can cause a high rate of defective products.
3. This kind of engagement is not secure enough, resulting in the disengagement of the upper cap and the base board due to the vibration of the miniature motor.
4. The base board and the motor lid are produced as two separate parts, making the production procedure redundant and the cost thereof high.

To make an improvement on the prior art transmission gear box, the present inventor developed a gear box for a miniature motor which is simple in structure, easy to assemble and secure in engagement.

SUMMARY OF THE INVENTION

Therefore, the primary object of the present invention is to provide an improved transmission gear box which is provided with a motor-mounted round plate having a central through hole for the passing of the shaft of a miniature motor with a number of protrusions disposed on the periphery thereof; and a cap having a number of corresponding recesses or protrusions disposed on the bottom edge thereof so as to permit a transmission gear set housed in the space between the cap and the round plate.

Another object of the present invention is to provide an improved transmission gear box which is provided with a pair of symmetric oval shaped through holes through which fastening screws are located on each side of the central through holes so as to lock the round plate in place.

One further object of the present invention is to provide an improved transmission gear box which is provided with a round plate onto which the transmission gear set can be positioned with ease.

One further object of the present invention is to provide an improved transmission box which is simple in structure, easy to assemble and ready to produce.

DETAILED DESCRIPTION OF DRAWINGS

DETAILED DESCRIPTION OF THE PREFERRED EMBODIMENTS

Figure 1:
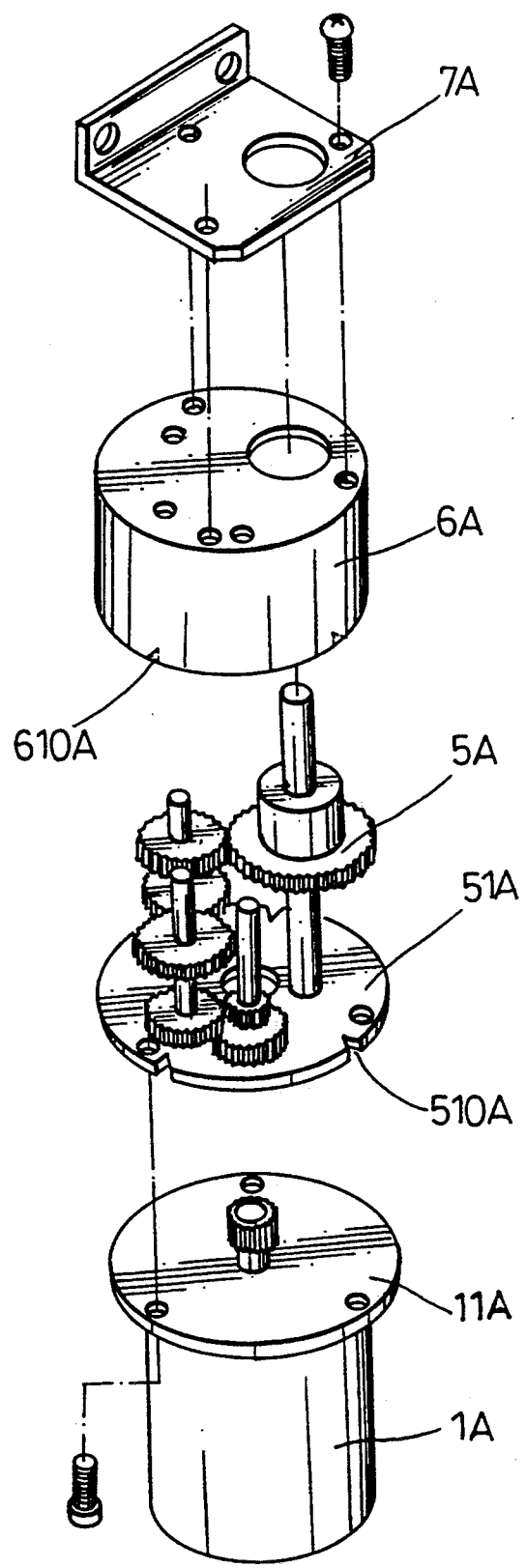
FIG. 1 is a diagram showing the prior art transmission gear box.
Figure 2:
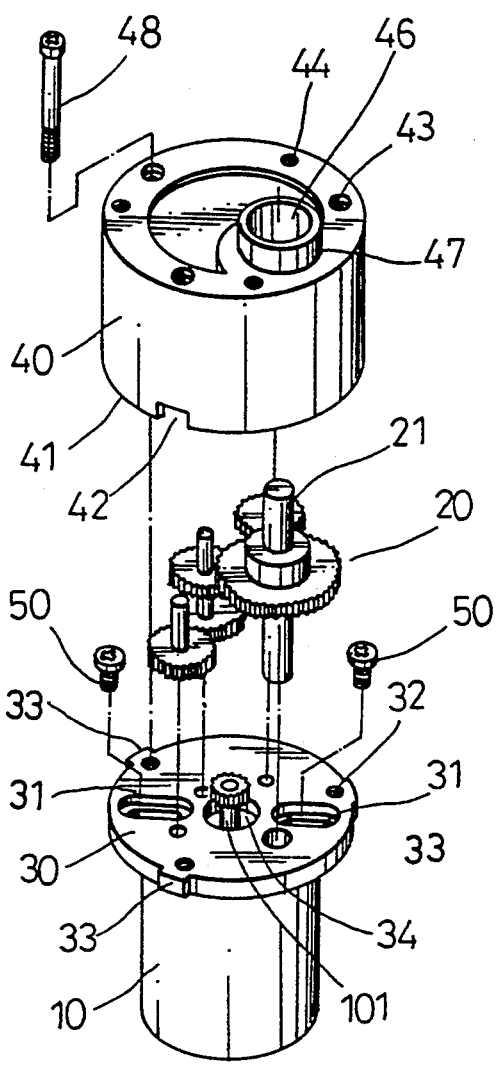
FIG. 2 is a diagram showing the exploded components of the present invention.

Referring to FIG. 2, the improved transmission gear box is comprised of a miniature motor 10, a gear set 20, a round plate 30, a cap 40 wherein the miniature motor 10 and the gear set 20 are conventional parts and will not be described in details hereinafter.

The round plate 30 is provided with a central through hole 34 through which the shaft 101 of a miniature motor 10 extends; and a pair of symmetrical oval-shaped through holes 31 each disposed on one side of the central through hole 34 so as to permit the round plate 30 to be secured to the miniature motor 10 by means of screws 50. As shown in FIG. 2, on the periphery of the round plate are disposed three equally spaced screw holes 32, and a protrusion 33 is disposed in proximity to each screw hole 32 on the peripheral edge thereof. A number of extra holes are disposed on the round plate 30 so as to permit the gear set 20 to be operably mounted thereto.

Figure 6:
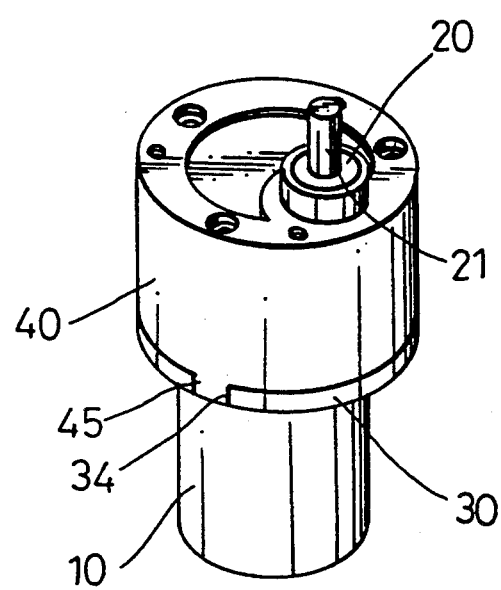
FIG. 6 is a perspective view of the present invention.

The cap 40 is integrally formed in a cylindrical shape and a number of recesses 42 in correspondence to the protrusions 33 defined on the bottom peripheral edge 41 thereof respectively and are in snap engagement with the recesses 42. A through hole 46 having a flanged skirt 47 disposed on the periphery thereof is eccentrically disposed in proximity to the periphery of the top end of the cap 40 so that the output shaft 21 of the gear set 20 can be led therethrough and be exposed externally, as shown in FIG. 6. A number of through holes 43 in alignment with the screw holes 32 of the round plate 30 are disposed on the top of the cap so that the cap 40 can be integrally secured to the round plate 30 by means of bolts 48. A number of screw holes 44 are disposed in proximity to the through holes 43 for the attachment of a positioning board to the cap 40.

Figure 3:
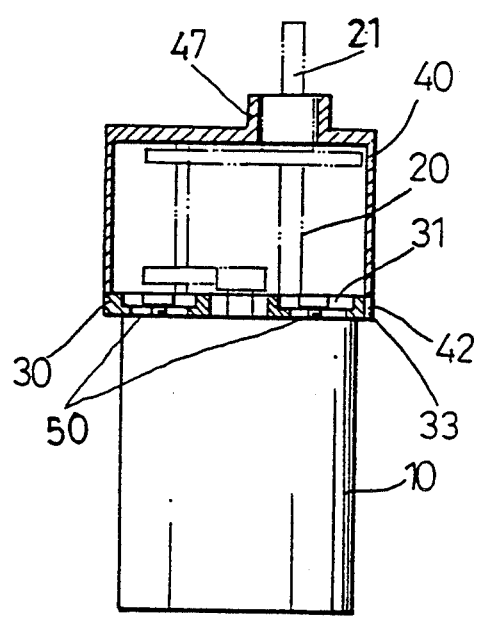
FIG. 3 is a sectional diagram showig the present invention in assembly.
Figure 4:
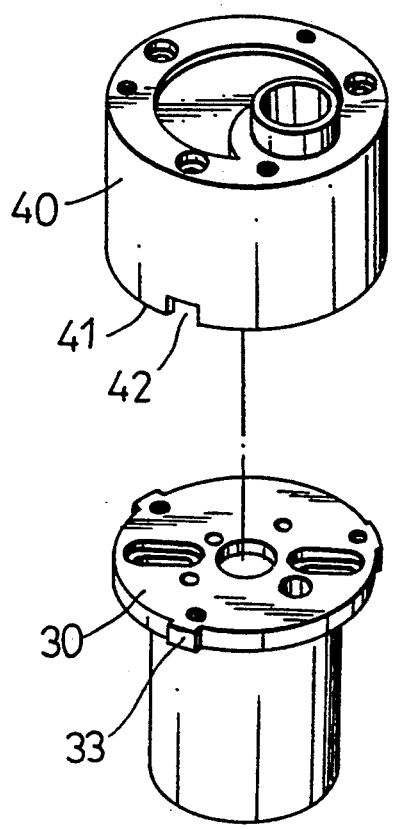
FIG. 4 is a diagram showing the round plate with a number of protrusions disposed on the periphery thereof and a corresponding cap having a number of recesses disposed on the bottom edge thereof.

As shown in FIG. 3, in the assembly of the present invention, the round plate 30 is integrally mounted to the motor 10 first by way of the screws 50 located in the oval-shaped through holes 31 with the shaft 101 of the miniature motor 10 sticking out of the central through hole 34 of the round plate 30. Then the gear set 20 is positioned in association with the top of the round plate 30, and the cap 40 is put on top of the round plate 30 with the protrusions 33 in firm engagement with the corresponding recesses 42 to form a transmission gear box of the present invention for housing the gear set 20 therein, and the bolts 48 are located in the through holes 43 and engaged with the screw holes 32 of the round plate 30 with the output shaft 21 of the gear set 20 exposed externally so that the cap 40, gear set 20, round plate 30 and the miniature motor 10 can be integrally assembled.

Figure 5:
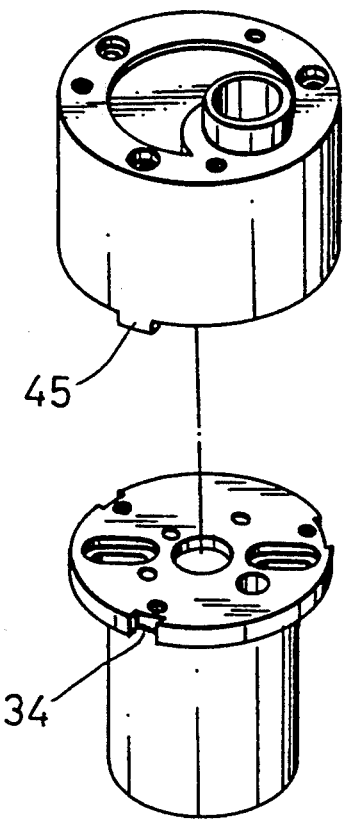
FIG. 5 is a diagram showing another round plate having a number of recesses disposed on the periphery thereof and a corresponding cap having a number of protrusions disposed on the bottom edge thereof.

As stated hereinbefore, the protrusions 33 disposed on the peripheral edge of the round plate 30 can be replaced by recesses 34, as shown in FIG. 5, and the recesses 42 disposed on the bottom peripheral edge 41 of the cap 40 can be accordingly converted into protrusions 45 for a change, and the cap 40 and the round plate 30 can also be firmly engaged with each other.

It can be clearly seen that the present invention employs a round plate 30 disposed between the miniature motor 10 and the cap 40 and secured to the miniature motor 10; and the transmission gear set 20 can be operably positioned on top thereof with ease so as to simplify the structure of the transmission gear box. Moreover, the protrusions 33 or recesses 34 on the periphery of the round plate 30 and the corresponding recesses 42 or protrusion or 45 defined on the bottom peripheral edge 41 of the cap 40 can securedly keep the cap 40 and the round plate 30 together in assembly. There are a number of inventive advantages inherent with the present invention given as below:

1. The use of a single round plate to support the gear set on top of the miniature motor can simplify the structure and reduce the parts used so as to make the production, assembly thereof and lower the production cost thereof.

2. The thickness of the protrusions of the round plate and the corresponding recesses of the cap is in conformance to the thickness of the wall of the cap so as to build up the strength of the engagement of the cap and the round plate to cope with larger torsional load without disengagement with each other.

3. The cap and the round plate are integrated together without use of rivets or the like so as to make the assembly easy and speedy.

I claim:

1. An improved transmission gear box adapted for a miniature motor, comprising:

a transmission gear set;

a round plate secured to the side of said miniature motor with the extended shaft of said motor passing therethrough;

a cylindrical cap disposed on top of said round plate with said gear set housed therebetween;

said round plate being provided with a central through hole for the passing of said shaft of said motor; and a pair of symmetrical oval-shaped through holes disposed on the opposite sides of said central through hole for the location of fastening means; and a number of screw holes disposed in proximity to the periphery thereof; and a number of other holes for the mounting of the shafts of said gear set thereto;

a number of protrusions disposed on the periphery of said round plate having a thickness equal to the wall of said cap;

a number of corresponding recesses in conformance to and in engagement with said protrusions disposed on the periphery of said round plate being disposed on the bottom peripheral edge of said cap;

a number of through holes disposed on the periphery of the top of said cap and in alignment with said screw holes of said round plate so as to permit bolt means to go therethrough and engage with said screw holes and secure the two together;

a number of equally spaced screw holes disposed on the periphery and in proximity to said through holes of the top end of said cap so that a positioning plate can be secured thereto;

an eccentric hole having a peripheral flanged skirt disposed thereon for the passing of an output shaft of said transmission gear set.

2. An improved transmission gear box adapted for a miniature motor, comprising:

a transmission gear set;

a round plate secured to the side of said miniature motor with the extended shaft of said motor passing therethrough; a cylindrical cap disposed on top of said round plate with said gear set housed therebetween;

said round plate being provided with a central through hole for the passing of said shaft of said motor; and a pair of symmetrical oval-shaped through holes disposed on the opposite sides of said central through hole for the location of fastening means; and a number of screw holes disposed in proximity to the periphery thereof; and a number of other holes for the mounting of the shafts of said gear set thereto;

a number of protrusions disposed on the bottom peripheral edge of said cap;

a number of corresponding recesses disposed on the periphery of said round plate complementary to and in engagement with said protrusions on the bottom peripheral edge of said cap;

a number of through holes disposed on the periphery of the top of said cap and in alignment with said screw holes of said round plate so as to permit bolt means to go therethrough and engage with said screw holes and secure the two together;

a number of equally spaced screw holes disposed on the periphery and in proximity to said through holes of the top and of said cap so that a positioning plate can be secured thereto;

an eccentric hole having a peripheral flanged skirt disposed thereon for the passing of an output shaft of said transmission gear set.

* * * * *